United States Patent [19]
Ito et al.

[11] Patent Number: 5,863,474
[45] Date of Patent: Jan. 26, 1999

[54] METHOD AND APPARATUS FOR ADJUSTMENT IN MOLD THICKNESS OF A COMPLEX MOLD CLAMPING SYSTEM

[75] Inventors: Katsuo Ito; Kiyoshi Sasaki, both of Shizuoka-ken, Japan

[73] Assignee: Toshiba Machine Co., Ltd., Tokyo, Japan

[21] Appl. No.: 788,267

[22] Filed: Jan. 24, 1997

[30] Foreign Application Priority Data

Jan. 24, 1996 [JP] Japan .................................. 8-009861

[51] Int. Cl.⁶ .......................... B29C 45/64; B29C 45/80
[52] U.S. Cl. ................... 264/40.5; 264/328.1; 425/150; 425/595; 425/451.9
[58] Field of Search ................................ 264/40.5, 40.1, 264/328.1; 425/149, 150, 589, 595, 450.1, 451.9

[56] References Cited

U.S. PATENT DOCUMENTS

| | | | |
|---|---|---|---|
| 4,106,885 | 8/1978 | Poncet | 425/595 |
| 4,304,540 | 12/1981 | Hammon | 425/595 |
| 4,504,208 | 3/1985 | Kurumaji et al. | 425/595 |
| 4,874,309 | 10/1989 | Kushibe et al. | 425/595 |
| 5,192,557 | 3/1993 | Hirata et al. | 425/595 |
| 5,196,150 | 3/1993 | Mimura et al. | 425/595 |
| 5,338,171 | 8/1994 | Hayakawa et al. | 425/595 |
| 5,620,723 | 4/1997 | Glaesener et al. | 425/595 |
| 5,753,153 | 5/1998 | Choi | 264/40.5 |

*Primary Examiner*—Jill L. Heitbrink
*Attorney, Agent, or Firm*—Whitman, Curtis & Whitham

[57] ABSTRACT

A method and system of controlling a screw engaging position adjuster provided in a complex mold clamping system. A theoretical deviation of a screw engaging position is theoretically calculated on the basis of a distance by which a movable die has been moved from an origin set for a mold thickness adjustment in clamping process. A measured deviation of the screw engaging position is measured from a distance between a mold clamping cylinder and a movable platen in clamping process. The screw engaging position adjuster is so controlled that a difference between the theoretical deviation and the measuring deviation is within an allowable deviation having previously been set.

8 Claims, 5 Drawing Sheets

METHOD AND APPARATUS FOR ADJUSTMENT IN MOLD THICKNESS OF A COMPLEX MOLD CLAMPING SYSTEM

BACKGROUND OF THE INVENTION

The present invention relates to a method and an apparatus for adjustment in mold thickness of a complex mold clamping system in injection molding machines, and more particularly to a method and an apparatus for adjustment in mold thickness to allow simplification of a half-nut screw engaging position adjusting feature used in die thickness adjustment.

A toggle type mold clamping system and a straight hydraulic mold clamping system have been well known as major mold clamping systems. By contrast, a complex mold clamping system is minor but attractive in possibility of scaling down in whole of the mold clamping system as compared to the major toggle type or straight hydraulic mold clamping systems. This complex mold clamping system is provided with a specific mold thickness adjusting system which will hereinafter be described with reference to FIGS. 1 and 3.

The complex mold clamping system essentially comprises the following elements. A pair of fixed and movable dies 10 and 14 are provided on a fixed platen 12 and a movable platen 16 respectively. Mold opening and closing cylinders 18 are provided at the edges of the fixed platen 12. The mold opening and closing cylinders 18 are mechanically connected via cylinder rods 18a to the movable platen 16. The movable platen 16 is unitary formed with a holder 26 which is slidably placed over a base 28. The fixed platen 12 and the mold opening and closing cylinders 18 are fixed on the base 28. A mold clamping cylinder 22 is movably placed on the holder 26. The mold clamping cylinder 22 is connected to the fixed platen 12 through tie bars 20 which are provided with screw portions 20a.

The mold clamping cylinder 22 is also coupled to the movable platen 16 through a cylinder ram 24. A screw engaging position adjuster 40 is further provided on the movable platen 22. Half nuts 30 are provided on the movable platen 16 so that the movable platen 16 is selectively engaged through the half nuts 30 to the tie bar screw portions 20a. After the fixed platen 12 and the movable platen 16 are closed to each other by the mold opening and closing cylinders 18 but before the fixed platen 12 and the movable platen 16 are clamped by the mold clamping cylinder 22, the half nuts 30 are engaged with the tie bar screw portions 20a through the screw engaging position adjuster 40 for adjustment in thickness of the fixed and movable dies 10 and 14. A mold thickens adjusting system comprises a control driver 50, the half nuts 30 operable under the control of the control driver 50 and the screw engaging position adjuster 40 connected to the control driver 50. FIGS. 1 and 2 are illustrative of the complex mold clamping system in the opened state and in the closed state respectively.

FIG. 4 is illustrative of the screw engaging position adjusting system of the complex mold clamping system. As illustrated in FIG. 4, the control driver 50 comprising a controller unit and a driver unit. The controller unit comprises a detector 52, an arithmetic unit 54 and a controller 56. The driver unit comprises an operational cylinder 32 for engagement of the half nuts 30 and a rotary driving hydraulic motor 42 of a sprocket 44 of the screw engaging position adjuster 40. The detector 52 is so designed as to detect a moving distance L between the mold thickness adjustment origin position P of the movable platen 16 and the clamped position P' thereof through an operational pressure "PC" of the mold opening and closing cylinders 18, where the following formula is given.

$$L/p = N + \Delta L$$

where p is the pitch of the half nuts 30 and the tie bar screw portions 20a, N is the integer and $\Delta L$ is the theoretical deviation of the screw engagement position when the engagement screw pitch is less than "p". The arithmetic unit 54 is so designed as the convert $\Delta L$ into a rotation number "n" for the sprocket 44.

In FIG. 1, the movable die 14 and the fixed die 10 are distanced from each other wherein the half nuts 30 are in the opening state. Then, the movable die 14 and the fixed die 10 come closed to each other by the mold opening and closing cylinders 18 as illustrated in FIG. 2. Subsequently, the sprocket 44 is rotated at a predetermined rotation "n" by the rotary driving hydraulic motor 42 for adjustment of the mold thickness before the half nuts 30 are engaged with the tie bar screw portions 20a under the operations of the operational cylinder 32 as illustrated in FIG. 3B.

The sprocket 44 has a contract surface 44b which is to be in contact with a contact member 24b placed through a spring 44c and around a base of a projecting screw axis 24a. After the half nut 30 was engaged with the tie bar screw portions 20a, a hydraulic port 22a of the clamping cylinders 22 is opened and pressure is applied through another hydraulic port 22b so that the fixed and movable dies 12 and 16 are closed. Thereafter, the half nuts 30 are opened by an operational cylinder 32 as illustrated in FIG. 3C, before the fixed and movable dies 12 and 16 are clamped through the mold opening and closing cylinders 18 as illustrated in FIG. 2.

According to the above method of adjustment of the molding thickness, a substantially continuous operation is possible in exchanging the dies.

The method of adjustment in the molding thickness of the above complex mold clamping system, however, has the following disadvantages.

As described above, the screw engaging position adjuster 40 comprises the sprocket 44 which is usually engaged via screw to a projection screw axis 24a on the ram 24 so that the sprocket 44 is mechanically driven by a hydraulic motor 42 through a transmission system 44a. The sprocket 44 is thus placed in front of a center portion of the mold clamping cylinder 22 and further the contact surface 44b is made into contact with the contact member 24b placed through the spring 44c and around the base of the projecting screw axis 24a. For those reasons, the screw engaging position adjuster 40 is structurally complicated and the maintenance works are trouble. Further, it is difficult to reduce the scale of the system and there is a limitation in place where the system is placed.

As a returning member, the springs are used, for which reason in the injection and compression molding, if the die opening amount is beyond 5 mm by a presumable high pressure of the injection resin, the above system is not responsible.

SUMMARY OF THE INVENTION

Accordingly, it is an object of the present invention to provide a mold thickness adjustment system which allows the complex mold clamping system to be scaled down.

It is a further object of the present invention to provide a mold thickness adjustment system which allows the complex mold clamping system to have a simple structure.

It is another object of the present invention to provide a method of adjustment in thickness of the die of the complex mold clamping system scaled down.

It is another object of the present invention to provide a method of adjustment in thickness of the die of the complex mold clamping system having a simple structure.

The above and other objects, features and advantages of the present invention will be described in detail with reference to the accompanying drawings.

In accordance with the present invention, a mold thickness adjustment system of the complex mold clamping system comprises a fixed platen on which a fixed die is provided, a movable platen on which a movable die is provided, mold opening and closing cylinders operated to make the fixed die and the movable die opened and closed through cylinder rods, a clamping cylinder coupled via a cylinder ram to the movable platen for moving the movable platen through tie bars with screws and selectively engaged to tie bar screw portions through half nuts operated under the control of a screw engaging position adjuster for closing the movable die to the fixed die before the half nuts come engaged onto tie bar screw portions through the screw engaging position adjuster for adjustment of the mold thickness prior to the clamping of the movable die to the fixed die by the mold clamping cylinder, wherein the screw engaging position adjuster comprises a theoretical deviation setting up device for setting up a theoretical deviation value of a screw engaging position calculated based upon a moving distance from a mold thickness adjustment origin position of the movable die on the closing process, a measuring deviation setting up device for setting up a measuring deviation value of a screw engaging position measured from a distance between the movable platen on the closing position and the mold clamping cylinder, an allowable deviation setting up device for setting up an allowable deviation value of the screw engaging position, a control driver for controlling a distance between the moveable platen and the mold clamping cylinder and a controller for controlling the screw engaging position adjuster so that if a difference between the theoretical deviation value set up and the measuring deviation value measured is within the allowable deviation value set up, then the screw engaging position adjuster is driven.

According to the present invention, the screw engaging position adjuster is controlled in the measuring deviation by a hydraulic driver, for example, a hydraulic cylinder so that the difference between the theoretical deviation value set up and the measuring deviation value measured is within the allowable deviation value set up.

The screw engaging position adjuster has a simple and compact structure and ahs a large degree of freedom in placement thereof onto the complex mold clamping system.

The present invention provides a method of controlling a screw engaging position adjuster provided in a complex mold clamping system. A theoretical deviation of a screw engaging position is theoretically calculated on the basis of a distance by which a movable die has been moved from an origin set for a mold thickness adjustment in clamping process. A measured deviation of the screw engaging position is measured from a distance between a mold clamping cylinder and a movable platen in clamping process. The screw engaging position adjuster is so controlled that a difference between the theoretical deviation and the measuring deviation is within an allowable deviation having previously been set.

BRIEF DESCRIPTIONS OF THE DRAWINGS

Preferred embodiments of the present invention will be described in detail with reference to the accompanying drawings.

PREFERRED EMBODIMENT

Figure 5:
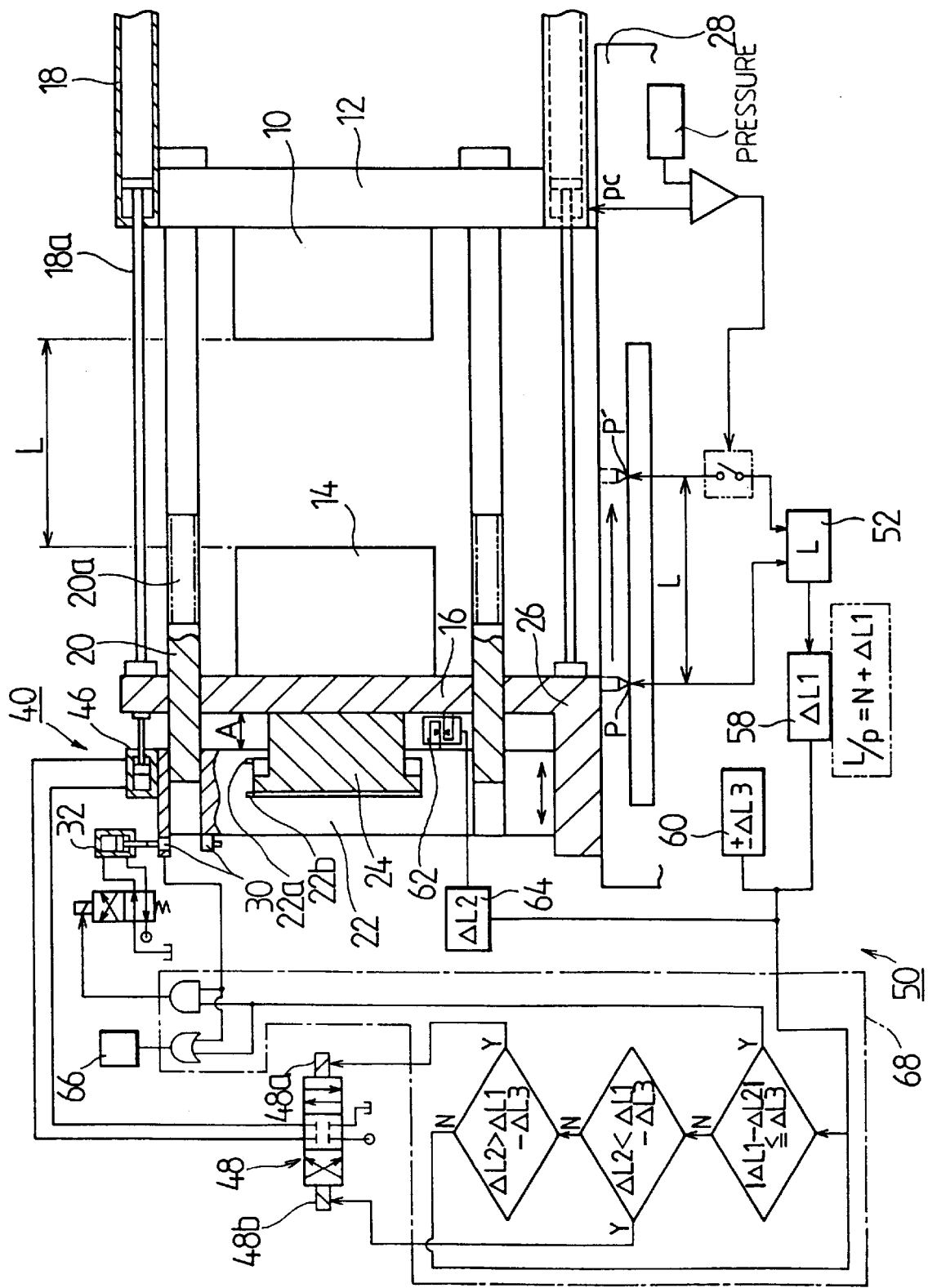
FIG. 5 is a view illustrative of a novel complex mold clamping system with an improved screw engaging position adjuster in the opened state in a preferred embodiment according to the present invention.

A preferred embodiment according to the present invention will be described in detail with reference to FIG. 5 which is illustrative of a novel complex mold clamping system with an improved screw engaging position adjuster in the opened state prior to entry into the closing process.

The novel complex mold clamping system structurally differs from the conventional one described above in the screw engaging position adjuster.

The complex mold clamping system essentially comprises the following elements. A pair of fixed and movable dies 10 and 14 are provided on a fixed platen 12 and a movable platen 16 respectively. Mold opening and closing cylinders 18 are provided at the edges of the fixed platen 12. The mold opening and closing cylinders 18 are mechanically connected via cylinder rods 18a to the movable platen 16. The movable platen 16 is unitary formed with a holder 26 which is slidably placed over a base 28. The fixed platen 12 and the mold opening and closing cylinders 18 are fixed on the base 28. A mold clamping cylinder 22 is movably placed on the holder 26. The mold clamping cylinder 22 is connected to the fixed platen 12 through tie bars 20 which are provided with screw portions 20a.

Figure 1:
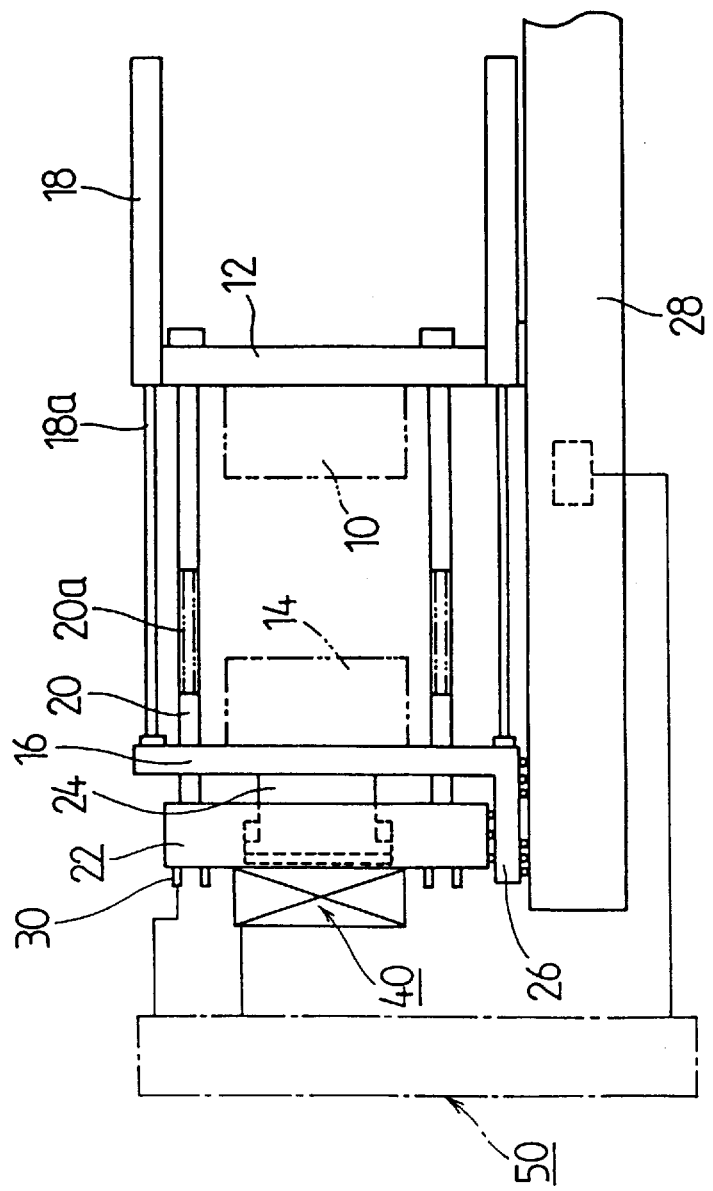
FIG. 1 is a schematic side elevation view illustrative of the conventional complex mold clamping system in the opened state.
Figure 2:
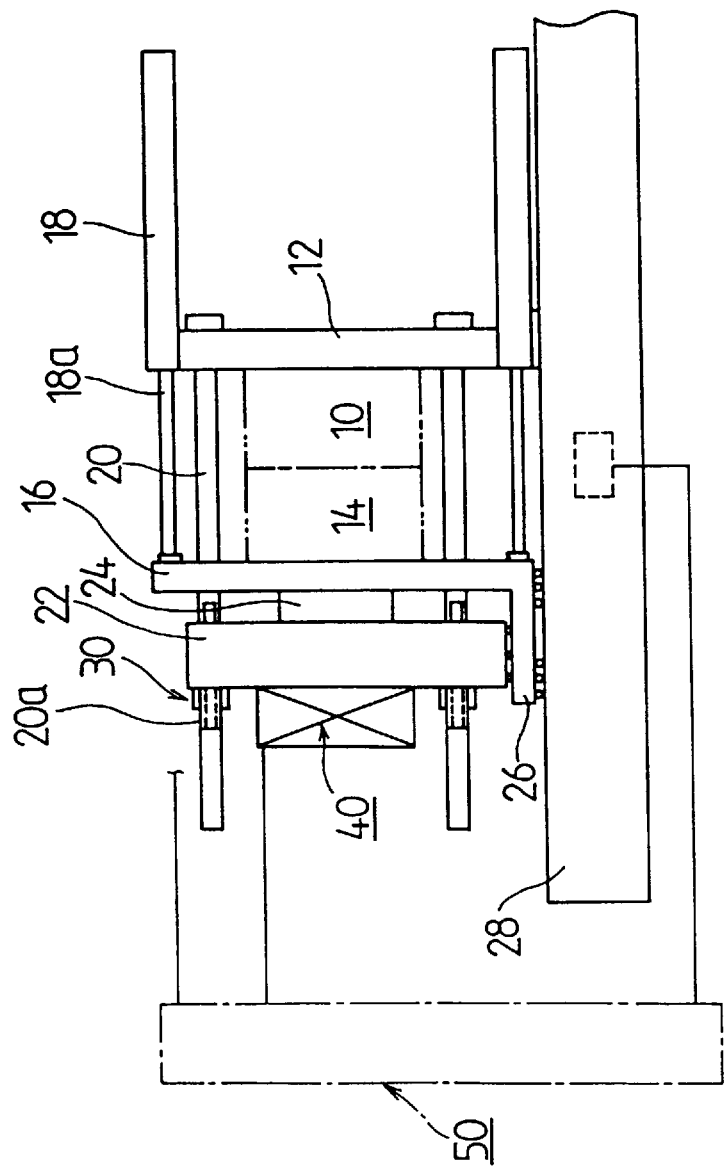
FIG. 2 is a schematic side elevation view illustrative of the conventional complex mold clamping system in the closed state.
Figure 3A:
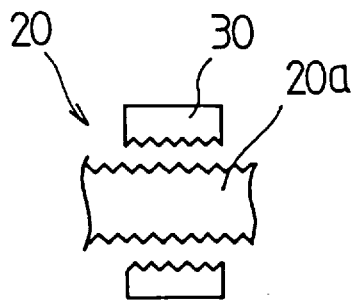
FIGS. 3A through 3C are view illustrative of half nuts in the performance states when the conventional complex mold clamping system in the opened state and in the closed state.
Figure 3B:
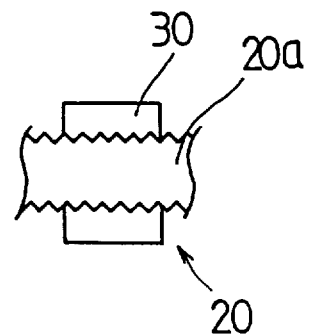
Figure 3C:
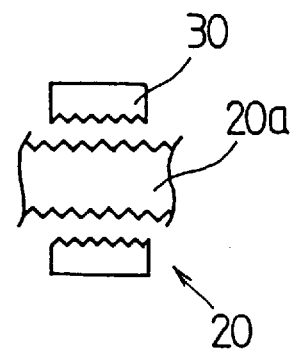
Figure 4:
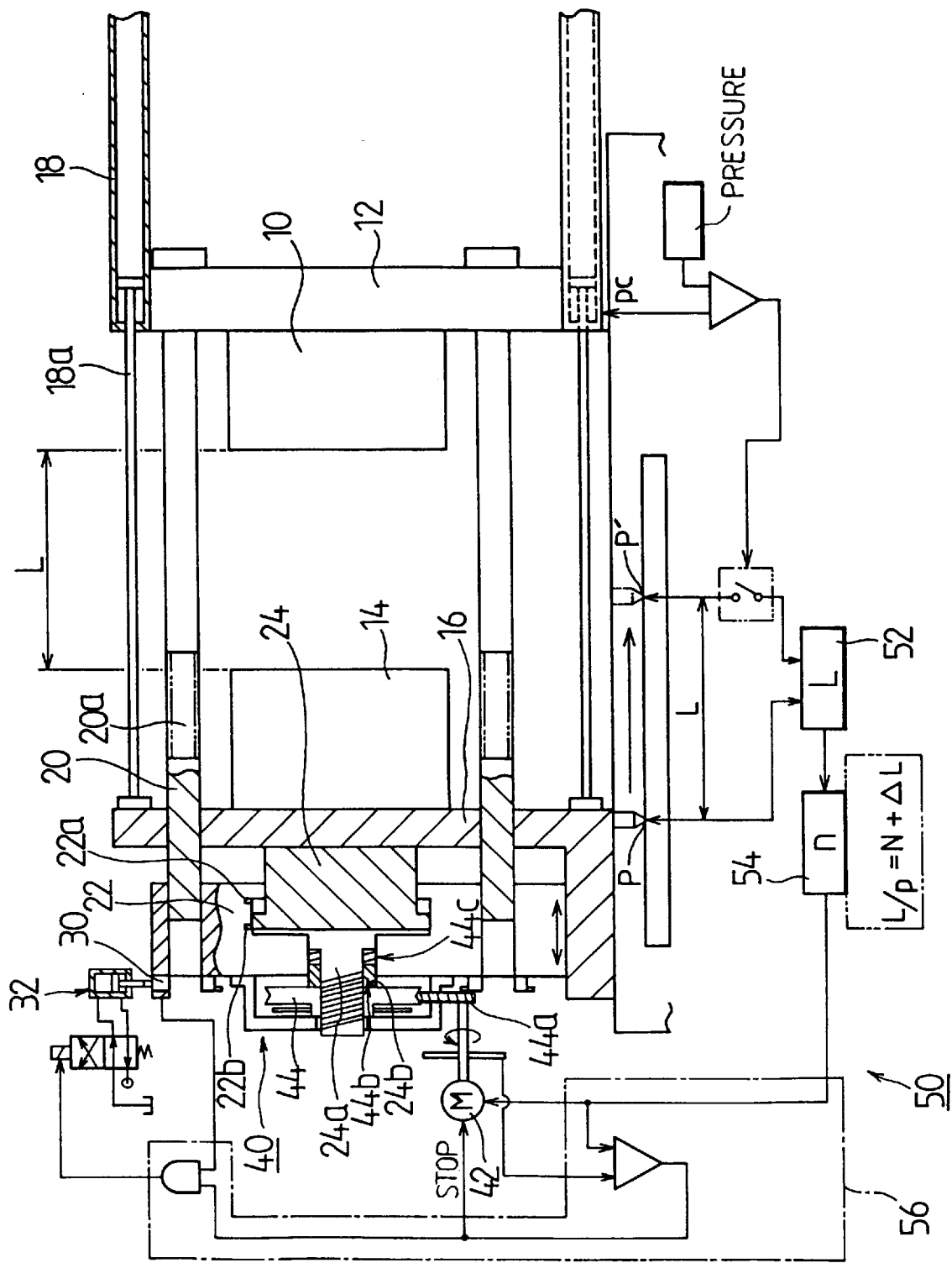
FIG. 4 is a view illustrative of the conventional complex mold clamping system with the conventional screw engaging position adjuster in the opened state.

The mold clamping cylinder 22 is also coupled to the movable platen 16 through a cylinder ram 24. A screw engaging position adjuster 40 is further provided on the movable platen 22. Half nuts 30 are provided on the movable platen 16 so that the movable platen 16 is selectively engaged through half nuts 30 to the tie bar screw portions 20a. The half nut 30 is driven by an operational cylinder 32. After the fixed platen 12 and the movable platen 16 are closed to each other by the mold opening and closing cylinders 18 but before the fixed platen 12 and the movable platen 16 are clamped by the mold clamping cylinder 22, the half nuts 30 are engaged with the tie bar screw portions 20a through the screw engaging position adjuster 40 for adjustment in thickness of the fixed and movable dies 10 and 14. A mold thickens adjusting system comprises a control driver 50, the half nuts 30 operable under the control of the control driver 50 and the screw engaging position adjuster 40 connected to the control driver 50. FIGS. 1 and 2 are illustrative of the complex mold clamping system in the opened state and in the closed state respectively. The cylinder ram 24 is provided with hydraulic ports 22a and 22b.

The control driver 50 comprises a control section and a driving section. The control section comprises an arithmetic set up device 58 operable in association with a detector 52, a set up device 60, a set up device 64 operable in association with a detector 62 and a controller 68. The driving section comprises a an operational cylinder 32 for driving the half nut 30 and a control cylinder 46 acting as the screw engaging position adjuster 40. The operational cylinder 32 drives the half nut 30 so that the half nut 30 is closed onto the tie bar screw portion 20a. It is possible to provide an alarm 66 in the controller 68 of the screw engaging position adjuster 40 for monitoring the system.

A novel method of adjustment in the mold thickness of the complex mold clamping system will be described with reference to FIG. 5 again.

1) Set an origin for adjustment in the mold thickness:

Independently from the thickness of the dies, the origin for adjustment in the mold thickness is determined based upon the position of the movable platen 16 provided on the injection molding machine, provided that the tie bars 20 are properly engaged with the half nuts 30 so that the size ($\Delta L_2$) of a distance "A" has a minimum value ($\Delta L_2 = 0$).

The detector 52 is so designed as to detect a moving distance L between the mold thickness adjustment origin position P of the movable platen 16 and the clamped position P' thereof through an operational pressure "PC" of the mold opening and closing cylinders 18, where the following formula is given.

$$L/p = N + \Delta L$$

where p is the pitch of the half nuts 30 and the tie bar screw portions 20a, N is the integer and $\Delta L1$ is the theoretical deviation of the screw engagement position when the engagement screw pitch is less than "p". The arithmetic unit 54 is so designed as to convert $\Delta L1$ into a rotation number "n" for the sprocket 44, whereby the theoretical deviation $\Delta L1$ is set by the arithmetic operation as described above. The set up device 60 is designed so that the allowable deviation $\Delta L3$ of the screw engaging position has previously been set therein. The detector 62 detects or measures the measured deviation $\Delta L2$ of the screw engaging position from the distance "A" between the movable platen 16 in the closing state and the mold clamping cylinder 22. The set up device 64 sets the above measured deviation $\Delta L2$ measured by the detector 62.

2) Method of adjustment in the mold thickness:

From the state being almost the same as illustrated in FIG. 2, the mold opening and closing cylinders 18 is operated to pull the movable platen 16 apart from the fixed platen 12. Simultaneously, an operational portion 48a of a directional switching valve 48 is operated to drive the control cylinder 46 so that the measured deviation $\Delta L2$ is zero.

Subsequently, if the origin for adjustment of the mold thickness is detected, then the motion of the mold opening and closing cylinders 18 is discontinued. If the measured deviation $\Delta L2$ comes zero, then the directional switching valve is made neutral to discontinue the motion of the control cylinder 46.

Then, the mold opening and closing cylinders 18 is driven to move the movable platen 16 to the fixed platen 12 so that the movable die 14 and the fixed die are closed. When the above die-closing motion is commenced, then the controller 68 stats to read the moved distance L by which the movable platen has been moved.

Thereafter, the mold opening and closing cylinders 18 is continued to be driven until the movable die 14 and the fixed die 10 are closed and contact with each other whereby the hydraulic pressure "pc" of the mold opening and closing cylinders 18 is risen and this risen hydraulic pressure "pc" is detected. The controller 68 does such control that the moved distance "L" is detected when the hydraulic pressure "pc" is detected as well as that $\Delta L1$ is stored in the arithmetic set up device 58 as the operational result based upon the above formula $L/p = N + \Delta L$.

Through the above operations, in the arithmetic set up device 58 such information is stored that how much the control cylinder 46 should be driven to result in proper engaging positions of the tie bars 20 and the half nuts 30. In this case, the arithmetic result $\Delta L$ remains unchanged unless the dies will be exchange with subsequent adjustment in the mold thickness or unless information about the origin for the adjustment of the mold thickness is deleted.

Subsequently, the operational portion 48b of the directional switching valve 48 is operated to commence the driving of the control cylinder 46 as well as the data about the moved distance L are sequentially stored in the set up device 64. If the operation achieves the arithmetic result $\Delta L$, then the directional switching valve 48 comes placed in the neutral state to stop the control cylinder 46. However, on the basis of the flow rate and the error, the measured deviation $\Delta L2$ is inputted into the set up device 64.

It is also possible to carry out the following operations by three judgment routines comprising the equations of $|\Delta L1 - \Delta L2| \leq \Delta L3$, $\Delta L2 \leq \Delta L1 - \Delta L3$, $\Delta L3$, $\Delta L2 > \Delta L1 - \Delta L3$.

Thereafter, the operational cylinder 32 is driven to make the tie bars 20 and the half nuts 30 engaged with each other. A position of the operational cylinder 32 is confirmed when the half nut 30 is in the closed position, whereby the operations are completed.

3) Method of driving the complex mold clamping system:

In the start to operate the complex mold clamping system, the movable platen 16 is positioned apart from the fixed platen 12. The moved distance L is referred for controlling the mold clamping operations but independent from the controls of the mold thickness, the opening and closing of the half nut 30, and the driving of the clamping cylinder 22. The distance "A" between the movable platen 16 and the fixed cylinder 22 is regarded to be the measured deviation $\Delta L2$ having been obtained by the mold thickness adjustment operations.

The clamping operation is commenced to drive the mold clamping cylinder 18 so that the movable and fixed dies 14 and 10 are made into contact with each other. If a difference between the arithmetic result $\Delta L1$ and the measured deviation $\Delta L2$ obtained, when the movable and fixed dies 14 and 10 are made into contact with each other, is larger than the allowable deviation $\Delta L3$ having been set in the set up device 60, the three judgment routines are repeated without making the half nut 30 closed. namely, the control cylinder 46 is made move in the forward or reverse direction for proper engagement. If the control cylinder 46 was made move excessively or insufficiently, then the control cylinder 46 is further made move slightly for obtaining the proper engagement.

The above allowable deviation $\Delta L3$ is, for example, set to be about 2 mm in consideration of the engagement of the half nut 30, release from the engagement, variation in size of the product due to thermal expansion of respective elements by variation in temperature of the molding machine.

In the above operations, the half nut 30 is closed unless any problem is raised up. The hydraulic port 22b of the clamping cylinder 22 is supplied with a pressure oil. The pressure oil is supplied until the clamping force of the clamping cylinder 22 becomes the value previously set thereby to commence the injection operation of the material.

Subsequently, the pressure extraction for opening the dies is carried out by opening the control valve and releasing the pressure oil from the hydraulic port 22b.

Subsequently, the half nut 30 is opened. After the opened state of the half nut 30 was confirmed, then the movable platen 16 is made to move by the mold opening and closing cylinders 18 to draw back limitation position for picking up the product. After this movement was completed, the above three judgment routines are again carried out and if a difference of the measured deviation $\Delta$ L2 from the theoretical deviation $\Delta$ L1 is within the allowable deviation $\Delta$ L3, then the process enters into the next step.

4) Method of driving the injection compression molding:

In the start to operate the complex mold clamping system, the movable platen 16 is positioned apart from the fixed platen 12. The moved distance L is referred for controlling the mold clamping operations but independent from the controls of the mold thickness, the opening and closing of the half nut 30, and the driving of the clamping cylinder 22. The distance "A" between the movable platen 16 and the fixed cylinder 22 is regarded to be the measured deviation $\Delta$ L2 having been obtained by the mold thickness adjustment operations.

The clamping operation is commenced to drive the mold clamping cylinder 18 so that the movable and fixed dies 14 and 10 are made into contact with each other. If a difference between the arithmetic result $\Delta$ L1 and the measured deviation $\Delta$ L2 obtained, when the movable and fixed dies 14 and 10 are made into contact with each other, is larger than the allowable deviation $\Delta$ L3 having been set in the set up device 60, then the three judgment routines are repeated without making the half nut 30 closed. namely, the control cylinder 46 is made to move in the forward or reverse direction for proper engagement. If the control cylinder 46 was made to move excessively or insufficiently, then the control cylinder 46 is further made to move slightly for obtaining the proper engagement.

The above allowable deviation $\Delta$ L3 is, for example, set to be about 2 mm in consideration of the engagement of the half nut 30, release from the engagement, variation in size of the product due to thermal expansion of respective elements by variation in temperature of the molding machine.

In the above operations, the half nut 30 is closed unless any problem is raised up. The hydraulic port 22b of the clamping cylinder 22 is supplied with a pressure oil. The pressure oil is supplied until the clamping force of the clamping cylinder 22 becomes the value previously set thereby to commence the injection operation of the material.

The injection power is applied which is larger than the clamping force having previously been set to thereby open the dies 10 and 14. An amount of the opening thereof is referred to as "$\alpha 1$". The distance "A" between the movable platen 16 and the clamping cylinder 22 is shortened by "$\alpha 1$".

A pressure oil is supplied to the hydraulic port 22b of the clamping cylinder 22 to rise the hydraulic pressure so that the dies are clamped. A rising amount of the hydraulic pressure is referred to as "$\alpha 2$".

Generally, the equation "$\alpha 1 \geq \alpha 2$" may be established. The measured deviation $\Delta$ L2 is varied by the difference between $\alpha 1$ and $\alpha 2$.

Subsequently, the pressure extraction for opening the dies is carried out by opening the control valve and releasing the pressure out from the hydraulic port 22b.

Subsequently, the half nut 30 is opened. After the opened state of the half nut 30 was confirmed, then the movable platen 16 is made move by the mold opening and closing cylinders 18 to a draw back limitation position for picking up the product. After this movement was completed, the above three judgment routines are again carried out and if $|\Delta L1 - \Delta L2| \leq \Delta L3$ is satisfied, then the process enters into the next step.

In accordance with the present invention, there is no feature which suppress variations of $\alpha 1$ and $\alpha 2$, for which reason the above novel complex mold clamping system is highly responsible or applicable to various injection molding machines.

The screw engaging position adjuster 40 comprises the control cylinder 46 which is, as illustrated in the drawings, structurally simple and scaled down. The degree of freedom is extremely large.

In accordance with the present invention, a mold thickness adjustment system of the complex mold clamping system comprises a fixed platen on which a fixed die is provided, a movable platen on which a movable die is provided, mold opening and closing cylinders operated to make the fixed die and the movable die opened and closed through cylinder make the fixed die and the movable die opened and closed through cylinder rods, a clamping cylinder coupled via a cylinder ram to the movable platen for moving the movable platen through tie bars with screws and selectively for moving the movable platen through tie bars with screws and selectively engaged to tie bar screw portions through half nuts operated under the control of a screw engaging position adjuster for closing the movable die to the fixed die before the half nuts come engaged onto tie bar screw portions through the screw engaging position adjuster for adjustment of the mold thickness prior to the clamping of the movable die to the fixed die by the mold clamping cylinder, wherein the screw engaging position adjuster comprises a theoretical deviation setting up device for setting up a theoretical deviation value of a screw engaging position calculated based upon a moving distance from a mold thickness adjustment origin position of the movable die on the closing process, a measuring deviation setting up device for setting up a measuring deviation value of a screw engaging position measured from a distance between the movable platen on the closing position and the mold clamping cylinder, an allowable deviation setting up device for setting up an allowable deviation value of the screw engaging position, a control driver for controlling a distance between the movable platen and the mold clamping cylinder and a controller for controlling the screw engaging position adjuster so that if a difference between the theoretical deviation value set up and the measuring deviation value measured is within the allowable deviation value set up, then the screw engaging position adjuster is driven.

According to the present invention, the screw engaging position adjuster is controlled in the measuring deviation by a hydraulic driver, for example, a hydraulic cylinder so that the difference between the theoretical deviation value set up and the measuring deviation value measured is within the allowable deviation value set up.

The screw engaging position adjuster has a simple and compact structure and has a large degree of freedom in placement thereof onto the complex mold clamping system.

Whereas modifications of the present invention will be apparent to a person having ordinary skill in art, to which the invention pertains, it is to be understood that embodiments as shown and described by way of illustrations are by no means intended to be considered in a limiting sense. Accordingly, it is to be intended to cover by claims any modifications of the present invention which fall within the spirit and scope of the present invention.

What is claimed is:

1. A method of controlling a screw engaging position adjuster provided in a two platen mold clamping system, said method comprising the steps of:

theoretically calculating a theoretical deviation of a screw engaging position engaging a half nut on a clamping cylinder on the basis of a distance by which the movable platen has been moved from an origin set for a mold thickness adjustment in clamping process and a closed position through an operational pressure of mold opening and closing cylinders;

measuring a measured deviation of the screw engaging position from a distance between a mold clamping cylinder and a movable platen in clamping process; and controlling a screw engaging position adjuster so that a difference between the theoretical deviation and the measuring deviation is within an allowable deviation having previously been set.

2. A two platen mold clamping system comprising:

a fixed platen having a fixed die;

a movable platen having a movable die;

mold opening and closing cylinders having cylinder rods, the cylinder rods opening and closing, a clamping cylinder ram being coupled to the movable platen;

a clamping cylinder mechanically being coupled to the clamping cylinder ram;

tie bars having screw portions;

half nuts being provided on the clamping cylinder, the half nuts being selectively engaged by the tie bars via the screw portions of the tie bars, a screw engaging position adjuster for controlling a distance between the movable platen and the clamping cylinder prior to the half nuts engaging the tie bar screw portions and further adjusting the mold thickness prior to the clamping of the movable die to the fixed die by the mold clamping cylinder, wherein the screw engaging position adjuster comprises:

a theoretical deviation setting up device setting up a theoretical deviation value of a screw engaging position calculated based upon a moving distance between a mold thickness adjustment origin position of the movable die on the closing process and a closed position through an operational pressure of the mold opening and closing cylinders;

a measuring deviation setting up device setting up a measuring deviation value of a screw engaging position measured from a distance between the movable platen on the closing position and the mold clamping cylinder;

an allowable deviation setting up device setting up an allowable deviation value of the screw engaging position;

a control driver controlling a distance between the movable platen and the mold clamping cylinder, and a controller controlling the screw engaging position adjuster so that if a difference between the theoretical deviation value set up and the measuring deviation value measured is within the allowable deviation value set up, then the screw engaging position adjuster is driven.

3. The two platen mold clamping system of claim 2, further comprising an alarm in the controller of the screw engaging position adjuster for monitoring the system.

4. The two platen mold clamping system of claim 2, further comprising:

a directional switch valve having an operational portion; and an operational cylinder receiving commands from the operational portion of the directional switch valve, the operational cylinder driving the half nuts.

5. The two platen mold clamping system of claim 4, wherein the directional switch valve further operates to commence the driving of a control cylinder, wherein the control cylinder controls the mold opening and closing cylinders.

6. The two platen mold clamping system of claim 2, further comprising a control cylinder controlling the mold opening and closing cylinders.

7. The two platen mold clamping system of claim 6, wherein the theoretical deviation setting up device controls the control cylinder resulting in proper engagement positions of the tie bars and the half nuts.

8. A screw engaging position adjuster for a two platen mold clamping system, said adjuster comprising:

a theoretical deviation setting up device for setting up a theoretical deviation value of a screw engaging position engaging a half nut on a clamping cylinder and calculated based upon a moving distance between a mold thickness adjustment origin position of the movable platen on a closing process and a closed position through an operational pressure of mold opening and closing cylinders;

a measuring deviation setting up device for setting up a measuring deviation value of a screw engaging position measured from a distance between the movable platen on the closing position and a mold clamping cylinder;

an allowable deviation setting up device for setting up an allowable deviation value of the screw engaging position;

a control driver for controlling a distance between the movable platen and the mold clamping cylinder; and a controller for controlling the screw engaging position adjuster so that the screw engaging position adjuster is driven when a difference between the theoretical deviation value set up and the measuring deviation value measured is within an allowable deviation value set up.

* * * * *